United States Patent
Varner

(10) Patent No.: US 6,566,412 B2
(45) Date of Patent: May 20, 2003

(54) METHOD AND APPARATUS FOR REPROCESSING RUBBER TIRES

(76) Inventor: Lee H. Varner, 8120 E. Jefferson, Apt. 2N, Detroit, MI (US) 48214

( * ) Notice: Subject to any disclaimer, the term of this patent is extended or adjusted under 35 U.S.C. 154(b) by 35 days.

(21) Appl. No.: 09/748,806

(22) Filed: Dec. 27, 2000

(65) Prior Publication Data

US 2002/0082309 A1 Jun. 27, 2002

(51) Int. Cl.$^7$ ................................................. C08J 11/04
(52) U.S. Cl. ........................... 521/41; 521/40; 521/40.5; 521/45.5
(58) Field of Search .................. 521/40, 40.5, 41, 521/41.5, 42, 42.5, 43, 43.5, 44.4, 44.5, 45, 45.5

(56) References Cited

U.S. PATENT DOCUMENTS

| | | | |
|---|---|---|---|
| 5,070,109 A | 12/1991 | Ulick et al. ................... 521/41 |
| 5,158,983 A | 10/1992 | Stapp ........................... 521/41 |
| 5,236,352 A | * 8/1993 | Carpenter ..................... 432/13 |
| 5,304,576 A | 4/1994 | Martinez ....................... 521/41 |
| 5,418,256 A | 5/1995 | Dhawan et al. ............. 521/44.5 |
| 5,438,078 A | 8/1995 | Butcher, Jr. et al. ........... 521/41 |
| 5,618,852 A | 4/1997 | Adkins ........................ 521/43.5 |
| 5,622,998 A | 4/1997 | Tanka et al. ................... 521/41 |
| 5,655,718 A | 8/1997 | Anderson ..................... 241/17 |
| 5,852,062 A | * 12/1998 | Carpenter ..................... 521/41 |

* cited by examiner

Primary Examiner—Edward J. Cain
Assistant Examiner—Katarzyna W. Lee
(74) Attorney, Agent, or Firm—Baker, Donelson, Bearman & Caldwell

(57) ABSTRACT

A method and apparatus is disclosed for recovering the rubber content of rubber containing goods such as vehicle tires. The goods are purged of air and immersed in a bath of liquid heated to a temperature sufficient to melt the rubber. The rubber being insoluble in the bath and of less density than the bath, it rises to the surface of the bath and is removed. The process employs a perforated process tube in which the goods are passed in the bath.

12 Claims, 1 Drawing Sheet

METHOD AND APPARATUS FOR REPROCESSING RUBBER TIRES

TECHNICAL FIELD

This invention relates generally to the recovery of the rubber content of manufactured goods, and particularly to methods and apparatuses for reprocessing rubber tires.

BACKGROUND OF THE INVENTION

Heretofore the rubber content of used vehicle tires has been recovered rather than incinerated or scrapped. This has been done by mechanically chopping the tires and grinding them and then separating the rubber and metal with a gravity air classifier or centrifuge. In other cases tires have been frozen, as with nitrogen, and then ground. These recycling processes however have been inefficient and very costly. The present invention provides a new method and apparatus for recovering the rubber content of used vehicle tires that is substantially more efficient and less costly to perform.

SUMMARY OF THE INVENTION

In a preferred form of the invention goods comprised of both rubber and heavier than rubber material are processed to recover their rubber content. The method comprises the steps of immersing the goods in a bath of liquid having a density greater than the density of the rubber and in which the heavier than rubber is insoluble and has a greater density than the bath. The bath is at a temperature elevated above the melting point of the rubber. This causes the rubber to become molten, to separate from the non rubber material, and rise to the top of the bath. The molten rubber and the heavier materials are then removed from the bath separately.

In another form of the invention apparatus for use in recovering the rubber content of goods that comprise rubber and heavier than rubber material comprises a separation tank, means for heating the separation tank, and a process tube that extends into and out of the separation tank. The process tube has perforations in its mid-portion that are located within the separation tank. The apparatus also has means for pushing the goods in the process tube to the mid-portion where their rubber content may be melted and flow out of the tube through the tube perforations and for pushing the residual non molten content of the goods out of an end of the tube located beyond the perforations.

DETAILED DESCRIPTION

Figure 1:
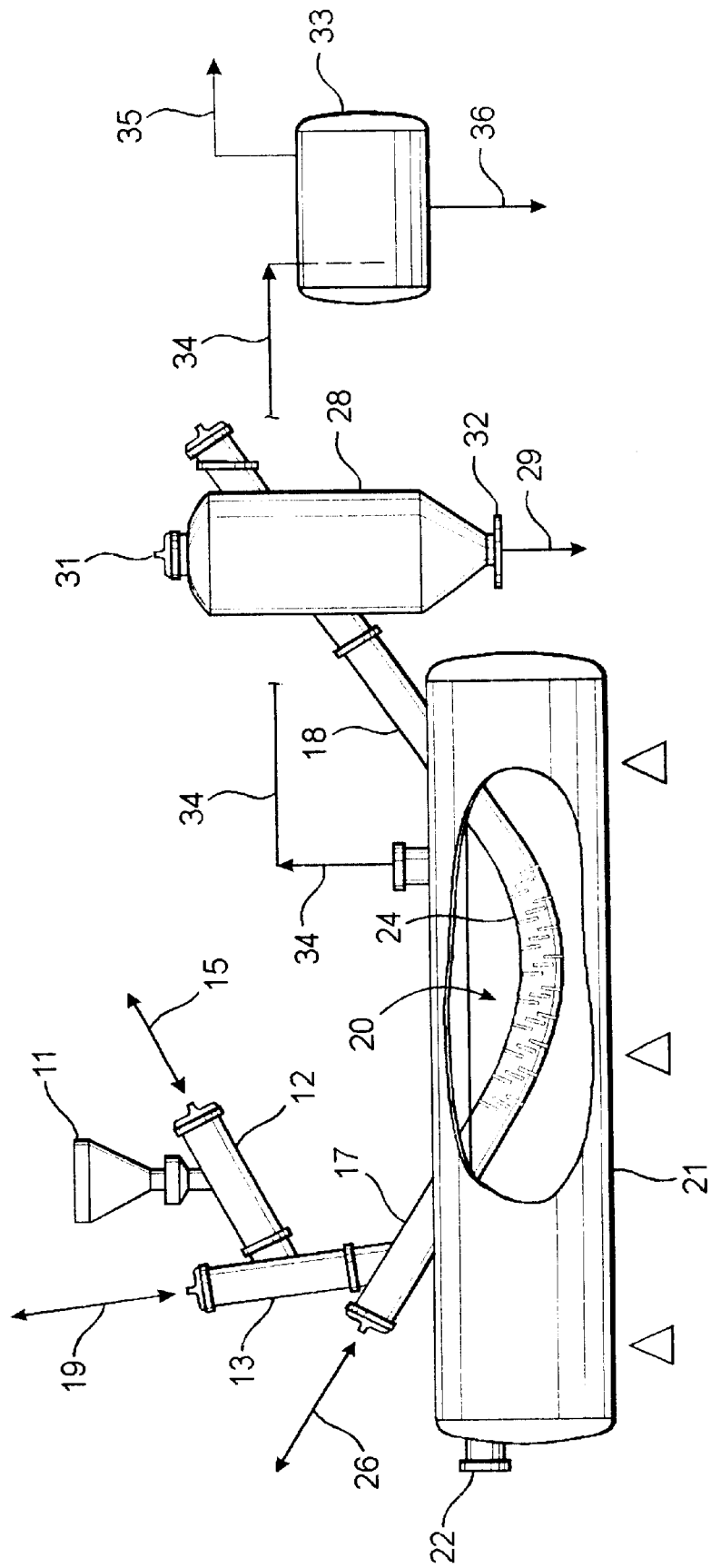
FIG. 1 is a schematic illustration of apparatus that embody principles of the invention in its preferred form and which may be used in performing a preferred inventive method of the invention.

With reference in more detail to the drawing there is shown apparatus that may be used to recover the rubber content of used or recycled vehicle tires. The apparatus comprises a hopper 11 into which tires may be deposited. Preferably the hopper is mounted on a scale for volume intake rate control. The hopper 11 is mounted over a first tubular chamber 12 from which it is isolatable by an unshown process block or gate valve. One end of the first chamber 12 is in communication with a second tubular chamber 13. These two chambers are also isolatable by another unshown process block or gate valve. Chamber 12 is provided with an hydraulic piston-like ram schematically as shown by arrows 15 for pushing discrete loads of material out of the chamber 12 and into the second chamber 13. The chamber 13 is provided with an unshown purge means for purging the chamber with a inert gas such as nitrogen or carbon dioxide. The second chamber 13 has a lower end mounted in communication with an intake end 17 of a process tube 20. The second chamber is also equipped with an hydraulic ram schematically shown by arrows 19 for use in pushing materials into the process tube through another unshown gate valve. All of the chambers are preferably made of a high impact resistant material such as steel.

The process tube 20 is seen to extend through a separation tank 21 which has a service port 22. The tank is provided with unshown means for heating it to operating temperatures in the range of 750° F. to 1000° F. This may be in the form of fuel-fired burners or electric heaters. Its intake end 17 is seen to be outside of the tank 21 as is its outlet end 18. It too is provided with an hydraulic ram shown schematically by arrows 26. Each of these ends are seen to be inclined and to straddle a bowed mid section 24 that is located inside the tank. The midsection is seen to have a number of perforations in the form of slots that are preferably circumferential arcs of some 30° to 45° each. The slots are in different quadrants of the process tube so that all quadrants have some slots.

The outlet end 18 of the process tube communicates with a collection drum 28 through another unshown gate valve into which metallic materials, such as steel belt and valve debris are delivered. This essentially non-rubber debris can be emptied out the bottom of the drum onto a conveyor as indicated by arrow 29. The collection drum 28 is equipped with an unshown hydraulic ram that is extendable from its top nozzle 31 to its bottom nozzle 32.

Finally, the apparatus includes a recovery tank 33 that is in fluid communication with the top of the tank 21 by a conduit shown schematically by arrows 34. This tank is used to receive rubber separated from non-rubber material in the separation tank 21 along with any gases. These gases can be flashed off as schematically indicated by arrow 35. Both the conduit 34 and recovery tank 33 are heated. From tank 33 rubber may be discharged in molten form as indicted by arrow 36.

For operation the separation tank 21 is filled with a liquid in which rubber is insoluble and which has greater density and thus is heavier than rubber. The heaters are energized to bring the apparatus up to operating temperature. If high density rubber is to be processed it may be preheated. Rubber tires are then deposited it the hopper 11. The tires may be whole or severed. Once a batch of preselected weight has been deposited, the batch is introduced into the first chamber 12 by opening the gate valve at the bottom of the hopper. The hopper gate valve is then closed and the batch transferred to the second chamber 13 by opening the gate valve between these two chamber and cycling the ram 15. The second chamber is then purged of air with the inert purge gas. From the second chamber 13 the batch is forced, air free, into the intake end 17 of the process tube 20 by synchronized operation of the ram 19 with the gate valve at the bottom of chamber 13 open and the gate valve between chambers 12 and 13 now closed.

Once the batch has been introduced into the process tube it is pushed by the ram 26 into the slotted midsection 24, the ram being sufficiently flexible to traverse the arcuate tube. With the batch now submerged in the hot liquid bath, the rubber melts. Being lighter than the bath, as the rubber melts it flows out of the process tube through the slots to the surface of the bath. As the separation tank is operated substantially filled with liquid, this surface is at or near the top of the interior of the tank. Conversely, the relatively heavy material, principally the metal debris from steel belts and valves, remains in the tube. This heavy debris being mostly larger than the slots, most of it does not pass out of the tube through the slots and onto the floor of the separation tank. What does fall to the floor is accumulated and periodically removed from the tank during periodic servicing and maintenance accessed via the service port 22.

From the surface of the bath the molten rubber is driven through the conduit 34 and into the recovery tank 33. It is driven by the volumetric displacement force provided by the continuous generation of gases in the heated separation tank. From here the rubber is periodically discharged in molten form as shown by arrow 36 while accompanying gases are outgassed and flashed as indicted at 35. As this is occurring the heavier debris is cyclically removed by the ram 26 from the process tube 24 into the collection drum 28 from which it is periodically dumped as shown at 29. This debris may include glass, solder, low melting alloys, metallic oxides and slags, and molten salts in addition to the debris from steel belts and valves. To insure that the outlet remains open, and that any bridged debris can be dislodged, an unshown hydraulic operated puller may be mounted in the outlet end 18.

As previously stated, the preferred operating temperature range is 750° F. to 1000° F. Below this range incomplete melting may occur; above this range high temperature degradable can become coke and gases. Although the method and apparatus is primarily designed for use in processing used vehicle tires it may, of course, be used to recover rubber from other types of manufactured goods.

Though the invention has been described in its preferred form it should be understood that modifications may be made thereto without departure from the spirit and scope of the invention as set forth in the following claims.

What is claimed is:

1. A method of processing used rubber tires comprised of both rubber and heavier than rubber material to recover their rubber content which method comprises the steps of immersing the used rubber tires in a bath of liquid having a density greater than the density of the rubber and less than the heavier than rubber material, the liquid being rubber insoluble and at a temperature elevated above the melting point of the rubber thereby causing the rubber to become molten and rise to the top of the bath, and removing the molten rubber from the bath, wherein the method is performed in substantially air free environment.

2. The method of claim 1 performed with the bath liquid elevated to a temperature within the range of 750° F. to 1000° F.

3. The method of claim 1 wherein the goods are immersed in the bath in a tube having openings through which the rubber exits the tube once it has become molten.

4. The method of claim 1 where the heavier than rubber materials are also removed from the bath, wherein the recovery method is performed in a substantially air free environment.

5. A method of recovering the rubber content of vehicle tires which comprises the steps of introducing the tires into a perforated tube that is submerged in a bath of liquid having a density greater than the density of the rubber and being at a bath temperature in excess of the molten point of the rubber for a time sufficient for the tire rubber to become molten and exit the tube through the tube perforations, extracting the residual non-molten content of the tires out of an exit end of the tube, and removing the molten rubber from the bath.

6. The recovery method of claim 5 performed with the bath elevated to a temperature within the range of 750° F. to 1000° F.

7. Apparatus for use in recovering the rubber content of used rubber tires that comprise rubber and heavier than rubber material, and with the apparatus comprising a separation tank containing a bath of liquid that is rubber insoluble; means for heating said separation tank to a temperature sufficient to melt rubber, a process tube that extends within and out of said separation tank, said process tube having perforations in a mid-portion of said tube located within said separation tank; and means for pushing goods in said process tube to said mid-portion where their rubber content may be melted and flow out of said tube through said tube perforations.

8. The recovery apparatus of claim 7 wherein said process tube mid-portion is arcuate.

9. The recovery apparatus of claim 7 further comprising means for introducing the used rubber tires into said process tube in a substantially air free environment.

10. The recovery apparatus of claim 7 further comprising a molten rubber recovery tank and a conduit extending from a top of said separation tank to said molten rubber recovery tank.

11. The recovery apparatus of claim 7 further comprising means for extracting the non-rubber content of the goods from said process tube.

12. The recovery apparatus of claim 11 further comprising a collection drum to which said process tube extends outside of said separation tank.

* * * * *